US007417417B2

(12) United States Patent
Williams et al.

(10) Patent No.: US 7,417,417 B2
(45) Date of Patent: Aug. 26, 2008

(54) SPILL-RESISTANT BEVERAGE CONTAINER WITH DETECTION AND NOTIFICATION INDICATOR

(76) Inventors: Don Patrick Williams, 4885 Highway 53, Harvest, AL (US) 35749; Mark T. Bowers, 5555 Bannergate Dr., Alpharetta, GA (US) 30022

( * ) Notice: Subject to any disclaimer, the term of this patent is extended or adjusted under 35 U.S.C. 154(b) by 0 days.

(21) Appl. No.: 11/356,748

(22) Filed: Feb. 17, 2006

(65) Prior Publication Data

US 2006/0261233 A1 Nov. 23, 2006

Related U.S. Application Data

(60) Provisional application No. 60/673,857, filed on Apr. 22, 2005.

(51) Int. Cl.

| | |
|---|---|
| ***G01N 27/00*** | (2006.01) |
| ***B65D 85/00*** | (2006.01) |
| ***G01K 13/00*** | (2006.01) |

(52) U.S. Cl. .................. 324/71.1; 206/459.1; 215/365; 374/150

(58) Field of Classification Search ................ 324/71.1, 324/76.11, 158.1, 721; 40/324, 326; 62/457.1-4, 62/371, 327, 529, 530; 436/22, 23, 24; 206/459.1, 206/534, 217; 362/101, 154; 422/50, 58, 422/61, 154; 215/365, 366, 367, 230; 374/150, 374/157, 101, 102, 103
See application file for complete search history.

(56) References Cited

U.S. PATENT DOCUMENTS

| | | | | |
|---|---|---|---|---|
| 3,864,976 | A * | 2/1975 | Parker | 374/161 |
| 4,292,916 | A | 10/1981 | Bradley et al. | |
| 4,563,726 | A | 1/1986 | Newcomb et al. | |
| 4,860,684 | A | 8/1989 | Al-Harbi | |
| 4,878,588 | A | 11/1989 | Ephraim | |
| 4,922,355 | A | 5/1990 | Dietz et al. | |
| 5,169,236 | A * | 12/1992 | Iest | 374/156 |
| 5,575,553 | A | 11/1996 | Tipton | |
| 5,608,383 | A * | 3/1997 | Neil | 374/102 |
| 5,662,406 | A * | 9/1997 | Mattice et al. | 362/101 |
| 5,678,925 | A * | 10/1997 | Garmaise et al. | 374/157 |
| 5,727,562 | A * | 3/1998 | Beck | 600/534 |
| 5,790,422 | A * | 8/1998 | Power et al. | 73/304 R |
| 5,839,581 | A | 11/1998 | Vagedes | |
| 6,036,055 | A * | 3/2000 | Mogadam et al. | 222/23 |
| 6,196,011 | B1 * | 3/2001 | Bessler | 62/186 |
| 6,225,908 | B1 * | 5/2001 | Lee et al. | 340/586 |
| 6,352,352 | B1 | 3/2002 | Schletterer et al. | |
| 6,353,391 | B1 * | 3/2002 | Shearer | 340/573.1 |
| 6,418,739 | B2 * | 7/2002 | Cho et al. | 62/187 |

(Continued)

FOREIGN PATENT DOCUMENTS

JP 08233465 A * 9/1996

(Continued)

*Primary Examiner*—Vincent Q. Nguyen
*Assistant Examiner*—Hoai-An D Nguyen

(57) ABSTRACT

A spill-resistant beverage container having a liquid freshness detector and notification device is described. The spill-resistant beverage container is comprised of cup, a beverage temperature sensor, a processing electronic circuit and a display device. The temperature sensor and processing electrical circuit are mounted within an enclosure on the bottom of the cup and the display device emits light or sound when the beverage temperature does not have a desired value.

16 Claims, 9 Drawing Sheets

U.S. PATENT DOCUMENTS

| | | | | |
|---|---|---|---|---|
| 6,502,418 | B2 | 1/2003 | Holley, Jr. | |
| 6,723,285 | B2 | 4/2004 | Chen et al. | |
| 6,741,180 | B2 * | 5/2004 | Lassota | 340/622 |
| 6,755,318 | B2 * | 6/2004 | Burke et al. | 220/703 |
| 6,864,462 | B2 * | 3/2005 | Sanoner et al. | 219/387 |
| 6,982,640 | B2 * | 1/2006 | Lindsay et al. | 340/540 |
| 2002/0097777 | A1 * | 7/2002 | Ronci | 374/157 |
| 2003/0106370 | A1 * | 6/2003 | Fearnside et al. | 73/149 |
| 2003/0219061 | A1 * | 11/2003 | Seeger | 374/152 |
| 2005/0235306 | A1 * | 10/2005 | Fima | 725/10 |
| 2006/0139928 | A1 * | 6/2006 | Griffiths et al. | 362/276 |

FOREIGN PATENT DOCUMENTS

| | | | |
|---|---|---|---|
| JP | 09303939 | A * | 11/1997 |

* cited by examiner

SPILL-RESISTANT BEVERAGE CONTAINER WITH DETECTION AND NOTIFICATION INDICATOR

CROSS-REFERENCE TO RELATED APPLICATIONS

This application is related to and claims priority to U.S. Provisional Patent Application No. 60/673,857, entitled "Spill-Resistant Drinking Container with Freshness Indicator" filed on Apr. 22, 2005, which is incorporated by reference herein.

FIELD OF THE INVENTION

The present invention generally relates to the field of spill-resistant beverage containers, such as children's sippy cups, baby bottles and training cups. More specifically, the invention pertains to such containers incorporating an electronic circuit for determining and displaying if the liquid contained therein is fresh or stale.

RELATED ART

Spill-resistant containers have lids and are typically used for storing beverages for situations where the beverage may accidentally be spill from an open-top cup. Sippy cups are a specific type of container made for dispensing beverages to children. Sippy cups include a cup body and a screw-on or snap-on lid having a drinking spout molded thereon. Typically a rubber or spring-loaded self-sealing outlet valve is incorporated within the lid of the sippy cup. The valve controls the outward flow of the beverage through the drinking spout. Spill-resistant containers of this general type have been around for over twenty years and are available at most stores that carry baby supplies. Most of the recent improvements in spill-resistant cups are related to appearance and shape, or in improved thermal performance.

One of the deficiencies with the conventional designs is that the parent cannot easily recognize a fresh beverage from a distance or simply cannot remember how long the beverage has been inside the cup. Hence the child may drink a stale beverage, such as sour milk or juice containing bacteria or mold because the cup gets lost and then found again much later by the child. It would be desirable if the parent could distinguish a fresh beverage from a stale beverage. It would also be desirable for the parent to be able to easily locate a misplaced beverage.

It would be desirable to have a children's spill-resistant beverage container that enables the parent or guardian to easily ascertain the freshness of the liquid contained therein from a substantial distance. It is also desirable for this new children's spill-resistant beverage container to be visually attractive to young children so that they prefer the new design in place of the standard available spill-resistant beverage containers on the market today. It is also desirable for this new container to be safe for children, reusable, easily cleaned, dishwasher safe, and suitable for high volume manufacturing.

SUMMARY OF THE DISCLOSURE

Generally, the embodiments of the present disclosure pertain to spill-resistant beverage containers with freshness detectors and indicators. Embodiments may be an add-on freshness indicator for existing beverage containers or may be incorporated in a new container. The disclosure is directed toward parents or guardians allowing them to easily ascertain the freshness of the beverage that may be consumed by a child. Embodiments of the disclosure may also encourage children to consume a desirable beverage contained in the container.

A beverage container in accordance with an embodiment of the present disclosure comprises a temperature sensor coupled to an outside surface of a cup, a comparator for determining if the beverage temperature is within desirable temperature values and a notification device to provide notification in response to the output of the comparator.

In another embodiment a method is provided for detecting and notifying when a beverage is stale, the method comprising the steps of sensing the temperature of the beverage, comparing the sensed temperature with a threshold temperature, and providing notification when the sensed temperature exceeds the threshold temperature.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

The present invention generally pertains to a spill-resistant beverage container with a freshness indicator. Although conventional spill-resistant beverage containers are available in a variety of shapes and designs, none of the conventional spill-resistant beverage containers have the features and characteristics of the spill-resistant beverage container of the present disclosure. Further, none of the spill-resistant beverage containers have the option to add a device for providing the features and characteristics of the present disclosure. The present disclosure is directed toward parents or guardians to enable them to easily ascertain the freshness of the beverage contained within the spill-resistant beverage container from a substantial distance. Further, the spill-resistant beverage container of the present disclosure uses the freshness indicator feature to encourage young children to consume a desirable beverage. While the present invention may be applied to several different embodiments commercially available such as a sippy cup, a baby bottle, a training cup or similar container the term "beverage container" will be used to refer to all such associated spill-resistant beverage containers throughout the detailed description. Further, the present invention could be applied to other containers. For example, the present disclosure may be used in the food and beverage industry, in hospitals and in any industry desiring to know the characteristics of a liquid in a container where the liquid's desirable characteristics change with temperature.

Figure 1:
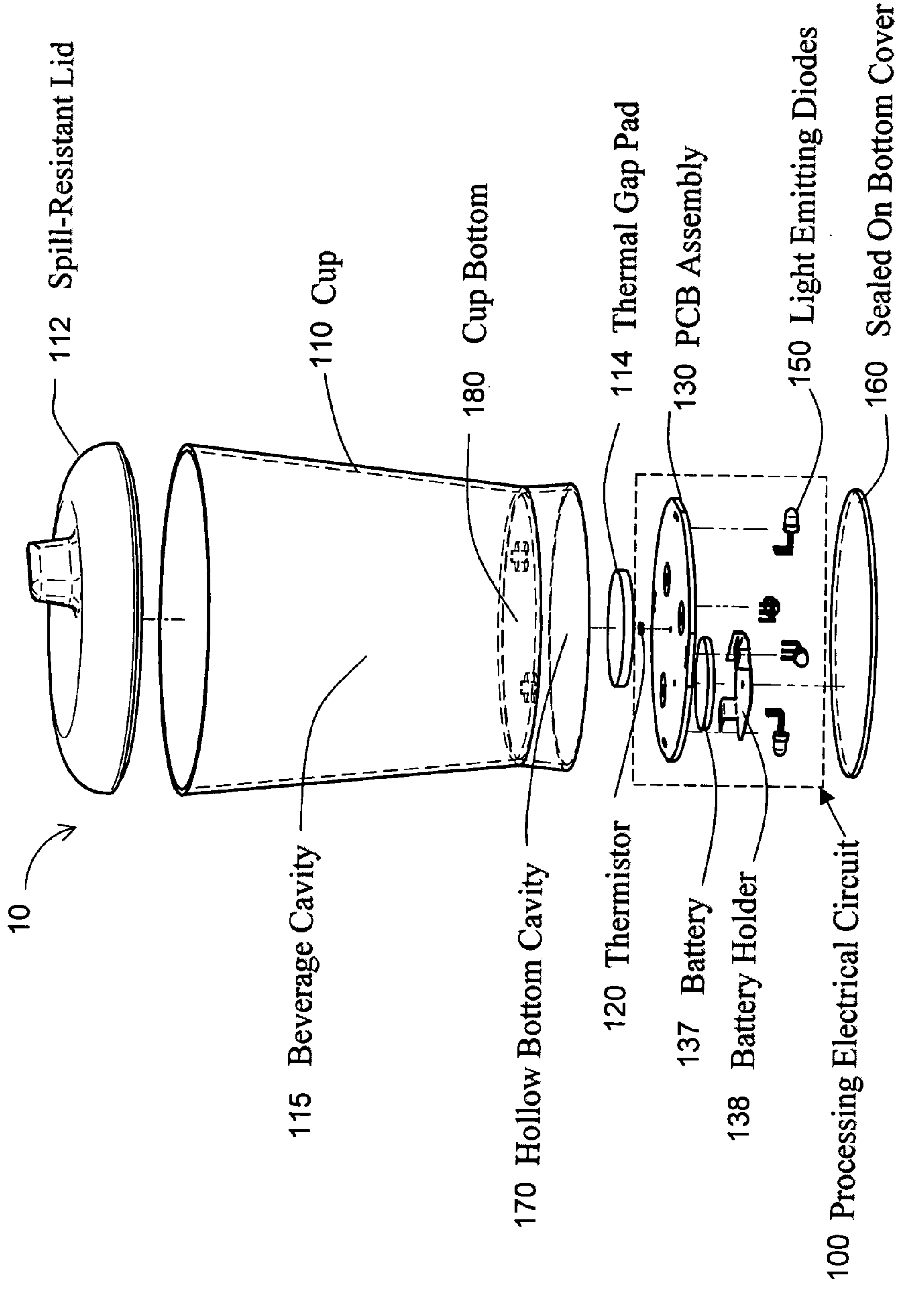
FIG. 1 illustrates a beverage container with freshness detection in accordance with the present disclosure.

Referring to FIG. 1 there is illustrated a beverage container 10 comprised of a cup 110 and processing circuit 100. A beverage cavity 115 within the cup 110 is provided for holding beverages (not shown) that are to be consumed. A bottom cavity 170 and a bottom cover 160 with a seal form a water tight enclosure for the processing circuit 100. The processing circuit 100 is comprised of a battery 137, a battery holder 138, a printed circuit board assembly 130, light emitting diodes (LEDs) 150 and a temperature sensor 120. The temperature sensor 120 is coupled to the outside surface of the cup bottom 180 with a thermal gap pad 114 in order to maintain thermal conductivity between the contained beverage and the temperature sensor 120. The temperature sensor 120 in one embodiment is a thermistor. It should be noted that the cup bottom 180 is a single wall and does not contain an insulating air gap as in some beverage containers. The placement of the processing circuit 100 must be such that the thermal gap pad 114 touches both the cup bottom 180 and the thermistor 120. The light emitting diodes (LEDs) 150 are used as a visual notification mechanism. Because the processing circuit 100 is completely sealed inside the hollow bottom cavity 170, the container material is transparent or semi-transparent to allow light from the LEDs 150 to pass through the walls of the bottom cavity 170 and sides of the cup 110. A spill resistant lid 112 is placed on top of the cup 110 after the cup is filled with a beverage.

Figure 2:
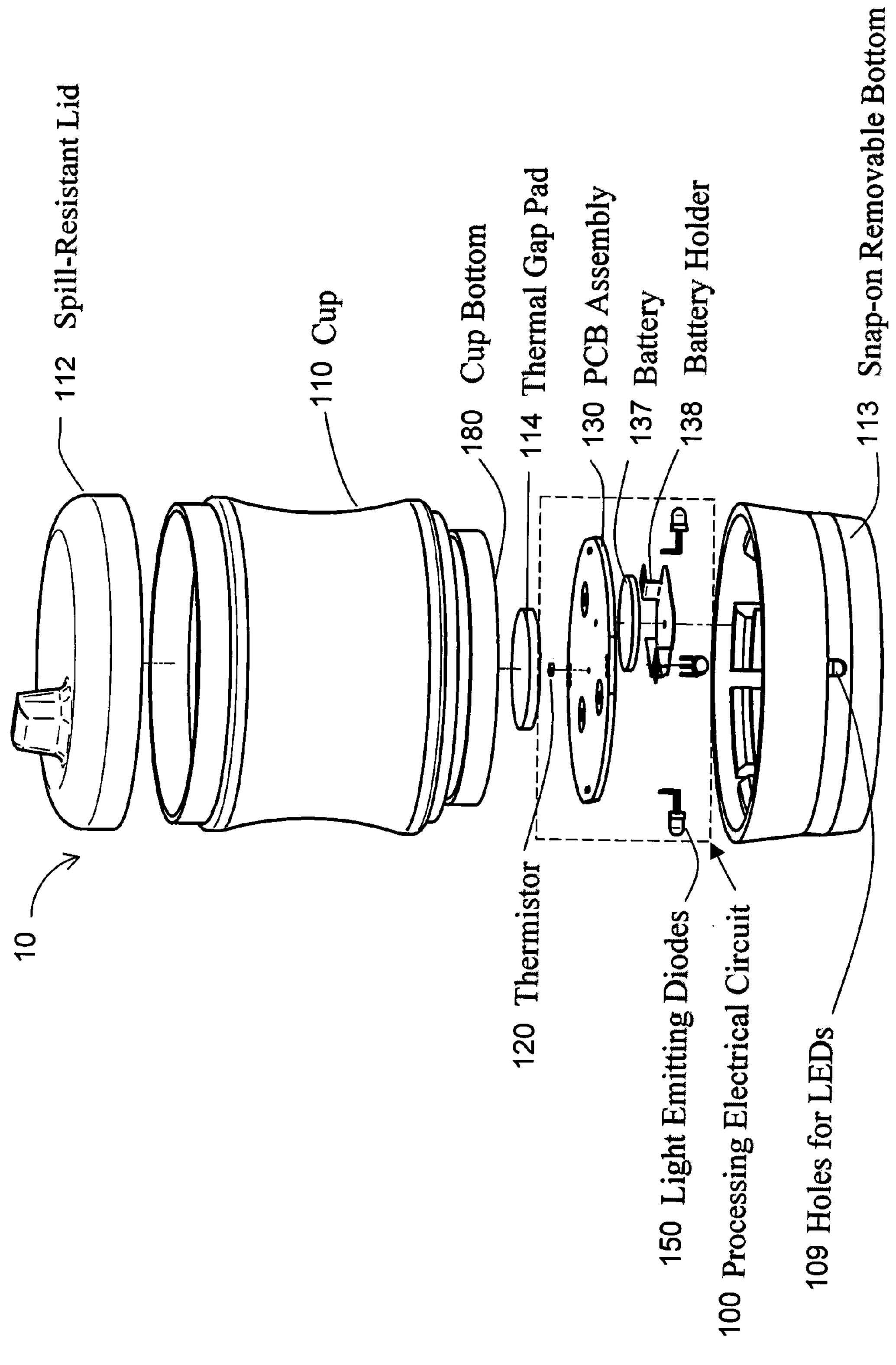
FIG. 2 illustrates another embodiment of a beverage container in accordance with the present disclosure.

Referring to FIG. 2 there is another embodiment of a beverage container 10 having processing circuit 100 shown disposed within a snap-on removable bottom 113. Mounting the circuit 100 into the removable snap-on bottom 113 allows the processing circuit 100 to be sold as an add-on to existing spill-resistant cups on the market today. The removable bottom 113 also allows the user to replace the battery 137 when needed. A thermal gap pad 114 is used to ensure good thermal conductivity between the cup bottom 180 and a thermistor 120. It should be noted that the cup bottom 180 must be single wall and does not contain an insulating air gap like some beverage containers. The design is such that when the removable bottom snaps into place the thermal gap pad 114 touches both the cup bottom 180 and the thermistor 120 to promote good thermal conductivity. In this embodiment the LEDs 150 protrude through holes 109 in the removable bottom 113 to allow the use of non-transparent material to match the color of spill-resistant containers commercially available today.

Figure 3:
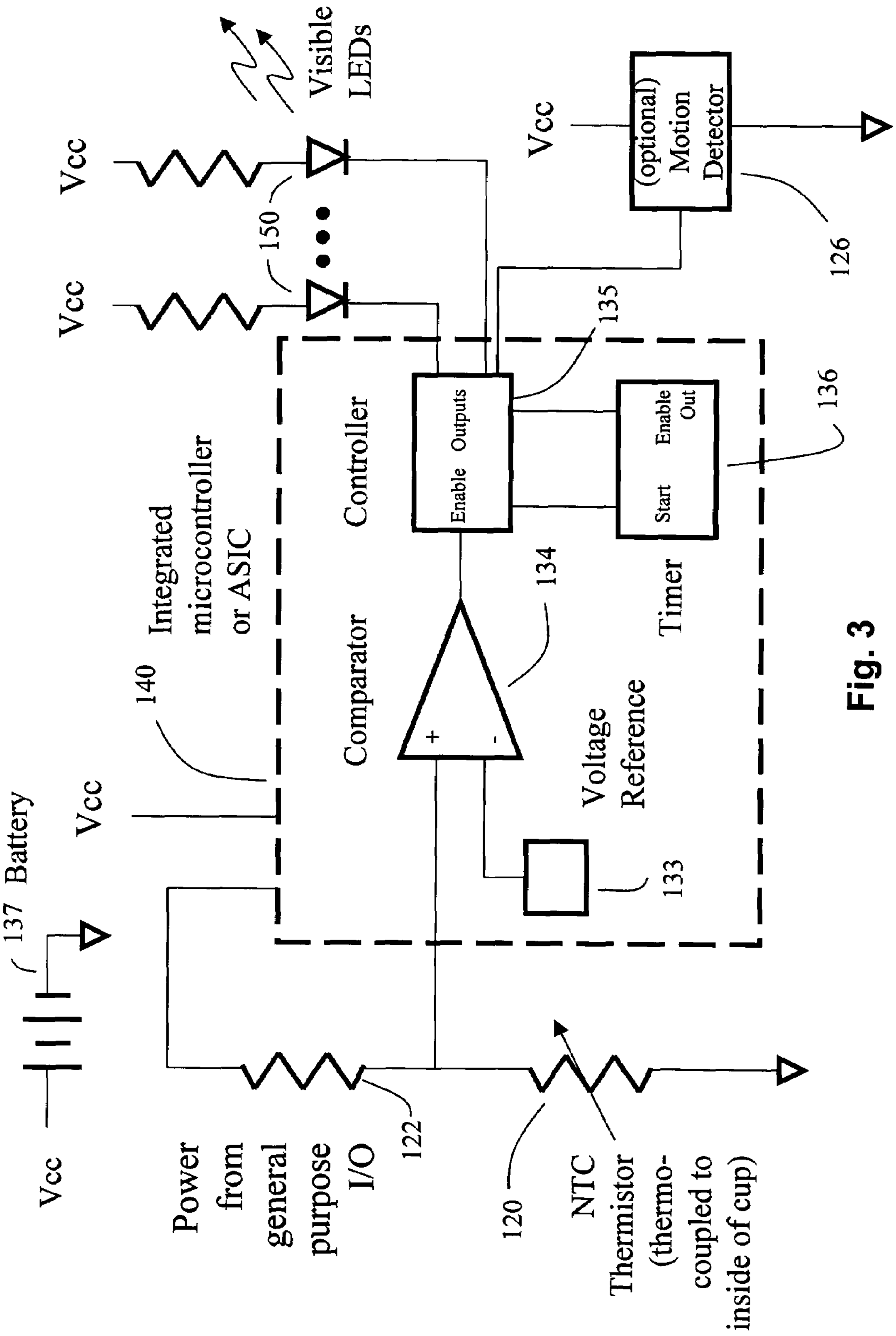
FIG. 3 illustrates a block diagram of an embodiment of an electrical circuit for the embodiments of FIG. 1 and FIG. 2.

Referring to FIG. 3 the processing electrical circuit 100 is shown in block diagram form. The battery 137 provides power to the processing electrical circuit 100. A resistor 122 is connected in series with a negative temperature coefficient thermistor (NTC thermistor) 120 to provide a voltage divider arrangement. This voltage divider arrangement is powered from a general-purpose input/output (GPIO) provided from an integrated microcontroller or ASIC 140. Power to the voltage divider is provided periodically, to conserve power, by the integrated microcontroller or ASIC 140 to obtain a temperature reading. The voltage across the thermistor 120 is compared to a reference voltage 133 by the comparator 134. The reference voltage 133 is set in one embodiment such that when the thermistor 120 is approximately 65 degrees or higher, the output of the comparator 134 is a logic LOW level. When a beverage that is below 65 degrees is introduced to the cup, the beverage absorbs the heat in the thermistor 120 and the resistance of the thermistor 120 rises. Due to the voltage divider formed by the resistor 122 and the thermistor 120, as the thermistor 120 resistance increases the voltage across the thermistor 120 will also rise. When the voltage across the thermistor 120 rises above the reference voltage 133, the comparator 134 output will transition to a logic HIGH level. Over time, the beverage will heat up causing the resistance of the thermistor 120 to fall and the voltage across the thermistor 120 to fall. When the voltage across the thermistor 120 falls below the voltage reference 133 the comparator 134 output will transition to a logic LOW level.

The output of the comparator 134 controls the enable input of a controller circuit 135. When the comparator 134 output is LOW the controller 135 does not flash the LEDs 150. Conversely, when the comparator 134 output is HIGH the controller 135 flashes the LEDs 150. Therefore, when a "cool" or "cold" liquid is introduced to the cup, the LEDs 150 will begin flashing. As the liquid heats up and approaches room temperature, the LEDs 150 will stop flashing. This serves as a visual indicator to notify the user of the relative "freshness" of the liquid. In another embodiment a timer 136 is incorporated in the notification process. In the embodiment with the timer 136, the controller 135 continues to flash the LEDs 150 for 10 minutes after the temperature of the liquid exceeds the temperature corresponding to the reference voltage 133. It should be noted that this time period is exemplary and could be different in other embodiments without deviating from the scope of this disclosure.

In another embodiment a motion detector 126 is added in order to conserve battery life. For example if the beverage container 10 is not moved for a selected amount of time, such as one minute, indicating that the cup is not being used, the LEDs 150 will stop flashing and only begin to flash again if the container is moved and the temperature of the beverage is below the reference temperature. It should be noted that the selected time value could be different in other embodiments without deviating from the scope of this disclosure.

In one embodiment, the reference voltage 133, the comparator 134, the timer 136, and the controller 135 are integrated into a single microcontroller or mixed signal ASIC 140. Other processing circuit arrangements that provide the functions as described herein are in the scope of the present disclosure.

Figure 4:
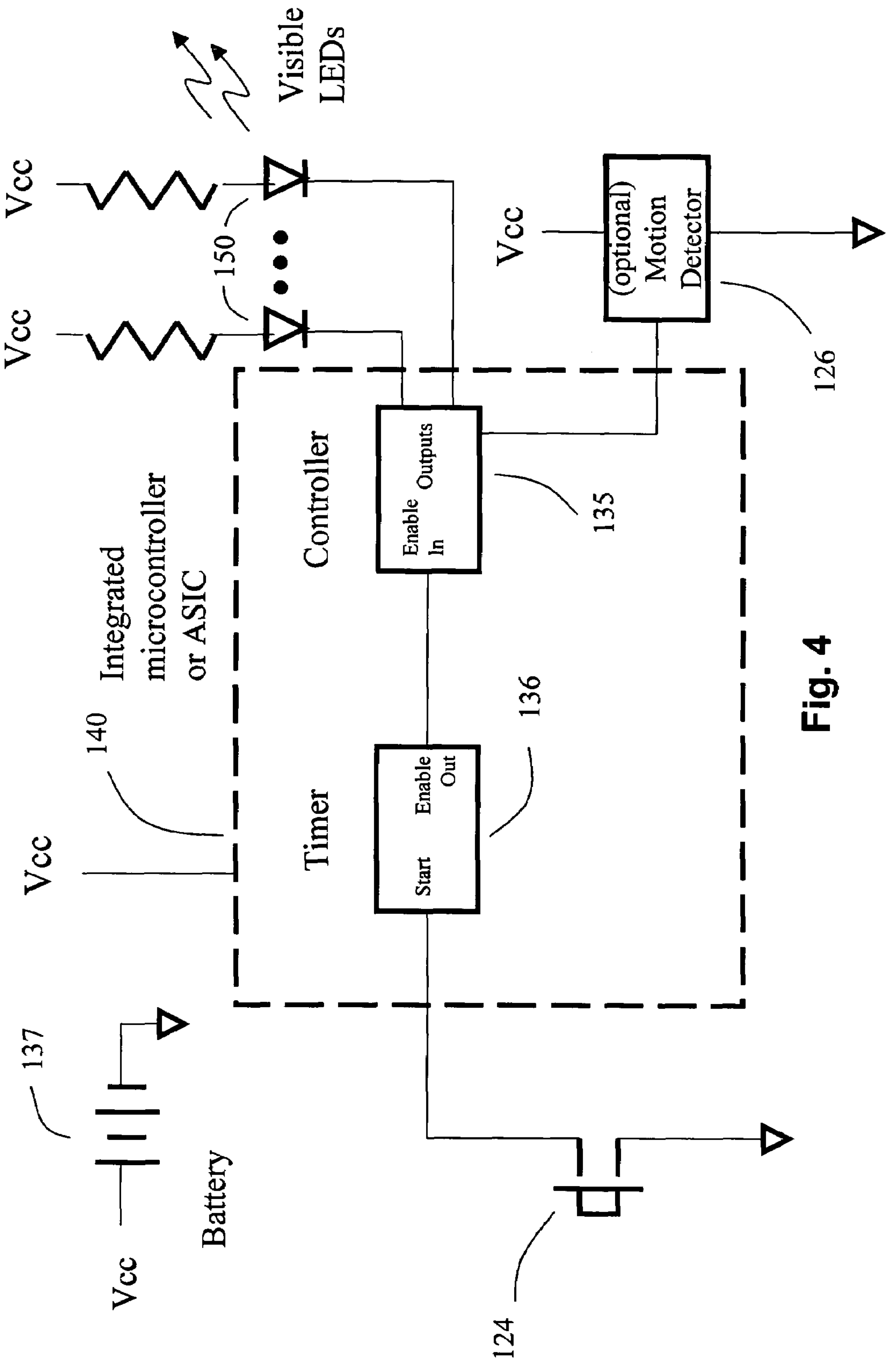
FIG. 4 illustrates a block diagram of another embodiment of an electrical circuit using a push button switch to activate a timing circuit for the container embodiments of FIG. 1 and FIG. 2.

Referring to FIG. 4, another embodiment of the processing electrical circuit 100 is shown in block diagram form. A switch 124, when pressed, sends an electrical signal to the timer 136. The timer 136 in response sends an "enable out" signal to the controller 135, which then causes the LEDs 150 to flash. The timer 136 could be implemented either as a digital counter, an analog resistor/capacitor arrangement, or some other timing element well known to those skilled in the art. Once enabled, the timer 136 remains enabled for a desired amount of time, such as for example 2 hours. It should be noted that this freshness time period could be different in other embodiments without deviating from the scope of this disclosure. When the timer 136 expires, the "enable out" is de-asserted and the LEDs 150 stop flashing.

In another embodiment, a feature in the timer 136 ignores any press of the switch 124 after the initial press that enabled the timer 136, unless the press is held for more than approximately 5 seconds. This feature prevents the child from accidentally resetting the timer 136. Pushing the switch 124 for short durations, as a child may do when playing, will not change the operation of the circuit. If the switch 124 is held down for a selected time such as approximately 5 seconds, the timer 136 is reset and the LEDs 150 stop flashing. This feature allows the user, presumably the parent, to reset the timer 136 before the predetermined time has expired. Another press of the switch 124 starts the timer 136 from the beginning. There is a provision made to add an optional motion detector 126 to conserve battery life. If the beverage container 10 is not moved for a selected time, such as one minute, a signal is provided indicating that the beverage is not being used and the LEDs 150 stop flashing and only begin to flash again if the cup 110 is moved and the freshness time period has not expired. It should be noted that the movement time period could be different in the other embodiments without deviating from the scope of this disclosure.

Figure 5:
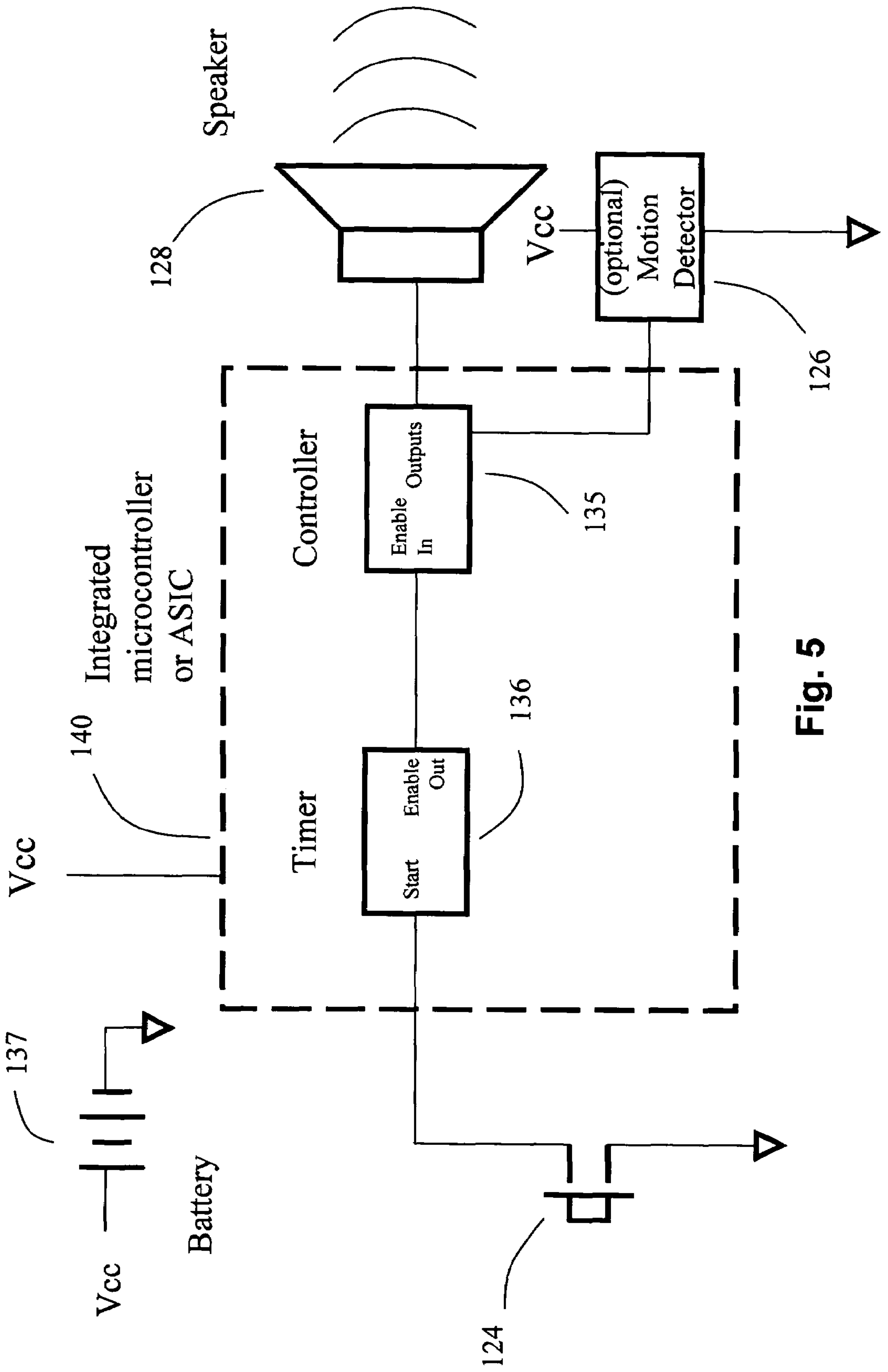
FIG. 5 illustrates a block diagram of another electrical circuit having a speaker for the container embodiments of FIG. 1 and FIG. 2.

Referring to FIG. 5, another embodiment of the processing electrical circuit 100 is shown that has a speaker 128 for providing audible notification. The switch 124, when pressed, sends an electrical signal to start the timer 136. The timer 136 could be implemented either as a digital counter, an analog resistor/capacitor arrangement, or some other timing element well known to those skilled in the art. Once enabled, the timer 136 remains enabled for a desired amount of time, such as for example 2 hours. When the timer 136 expires, the "enable out" is asserted and the controller starts to send an electrical alert pattern to the speaker 128. The speaker 128 will emit the alert pattern for approximately 5 minutes signaling that the beverage is no longer fresh. The alert pattern will be repeated every 10 minutes until the timer 136 is reset. The audible alert pattern serves as a reminder to the parent that the beverage needs to be discarded and ensures that the beverage container 10 is easily found. The speaker 128 could be implemented as a piezo buzzer or some other audio transducer well known to those skilled in the art. It should also be noted that the audible alert pattern and duration of said alert pattern could be varied without deviating from the scope of this disclosure.

A feature in the timer 136 ignores any press of the switch 124 after the initial press that enabled the timer 136, unless the press is held for more than approximately 5 seconds. This feature prevents the child from accidentally resetting the timer 136. Pushing the switch 124 for short durations, as a child may do simply playing, will have no effect on the overall operation of the circuit. If the switch 124 is held down for more than approximately 5 seconds, the timer 136 is reset. This feature allows the user, presumably the parent, to reset the timer 136 before the predetermined time has expired. Another press of the switch 124 will start the timer 136 from the beginning.

In another embodiment a motion detector 126 is added to alert the parent that the drink has been left alone. If the beverage container 10 is not moved for a period of 5 minutes, signaling that the cup has been forgotten about, the speaker 128 will emit a 5 second on, 5 second off alert pattern to notify the child where the beverage is located and to also notify the parent that the beverage is not being used and should be placed inside the refrigerator to keep fresh. Once the beverage is moved, the motion detector 126 will send a signal to the control circuit to cease the audible alert. The speaker 128 could be implemented as a piezo buzzer or some other audio transducer well known to those skilled in the art. It should be noted that this time period could be different in other embodiments without deviating from the scope of this disclosure.

Figure 6:
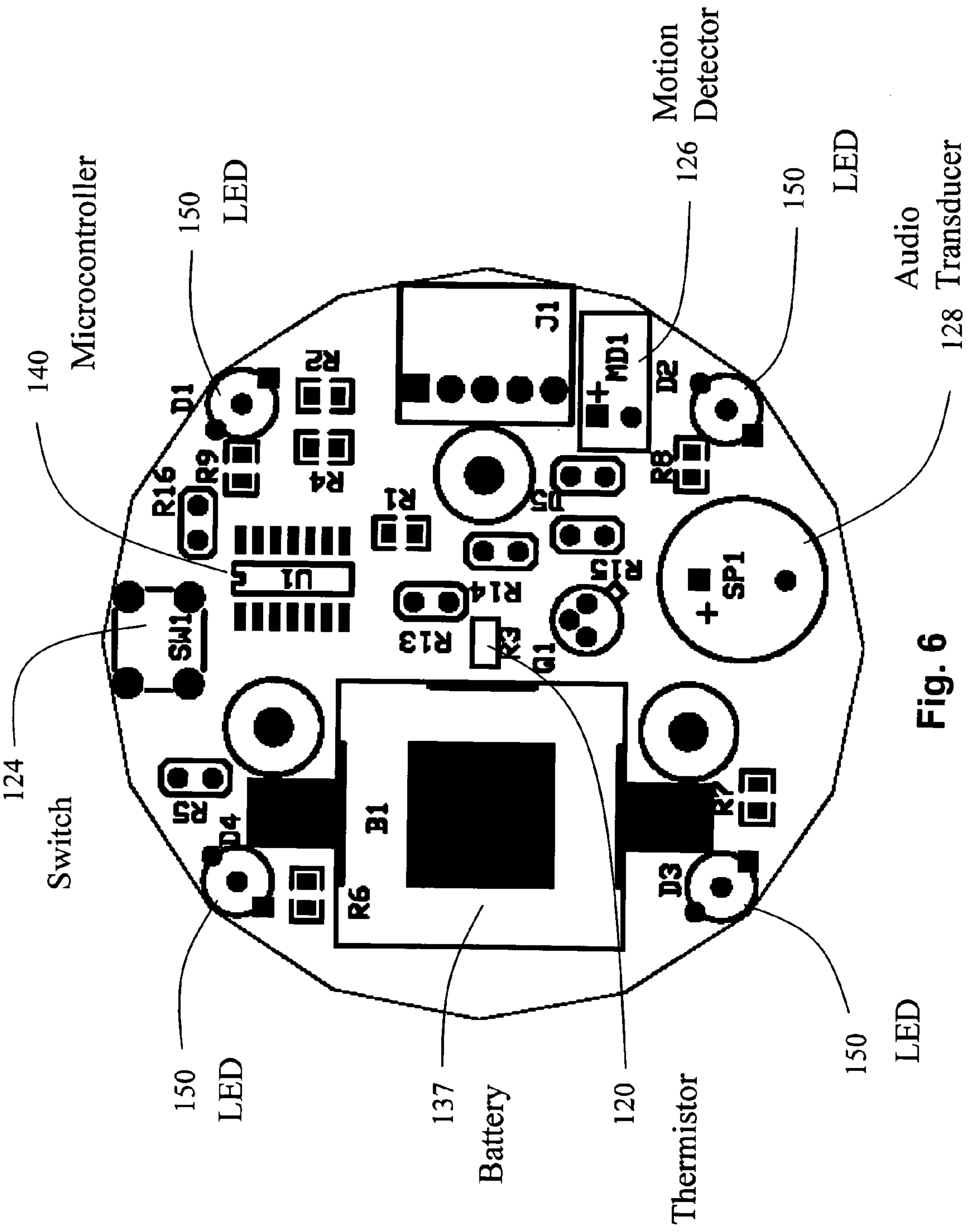
FIG. 6 illustrates and embodiment for a printed circuit board layout for the embodiments of the container in FIG. 1 and FIG. 2.

FIG. 6 illustrates the PCB 130 layout of the processing electrical circuit 100 including all alternative and optional circuit components. It should be noted that each alternative circuit is just a population option using this board. In high volume production the board will be cost optimized to include only the required components for the particular embodiment.

Figure 7:
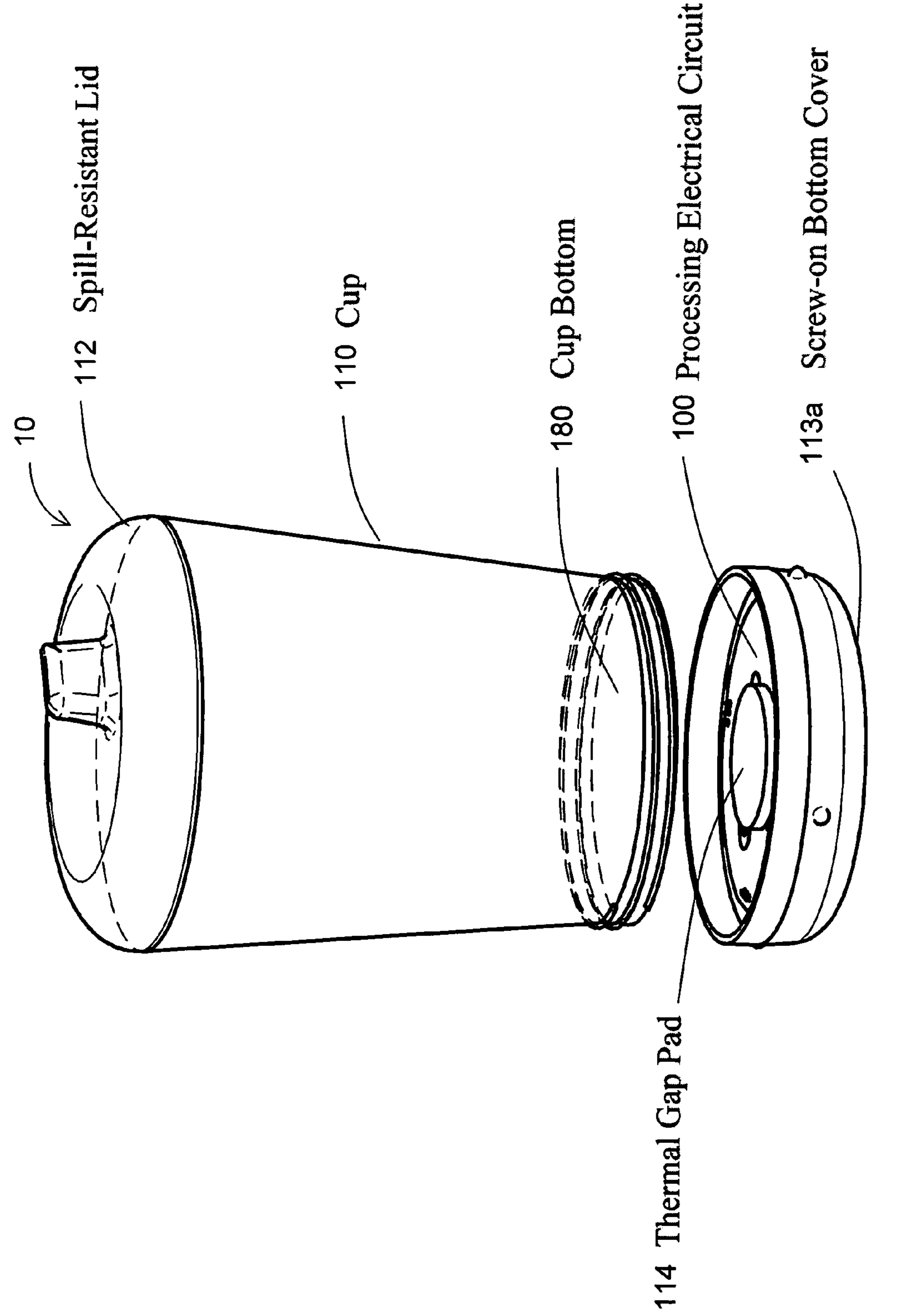
FIG. 7 illustrates another embodiment for the containers of FIG. 1 and FIG. 2.

FIG. 7 illustrates an alternate embodiment where the processing electrical circuit 100 is disposed into a screw-on removable bottom 113*a*. In this embodiment the circuit is water tightly sealed inside a removable bottom 113*a* once it has been screwed on to the cup 110 much in the same way the spill-resistant lid 112 seals itself to the cup 110. It should be noted that the construction material of the removable bottom should be transparent or semi-transparent to allow the visible light from the LEDs 150 to pass through the walls of the removable bottom 113*a*. The unit is designed such that the thermal gap pad 114 is compressed against the cup bottom 180 when screwed onto the cup 110.

Figure 8:
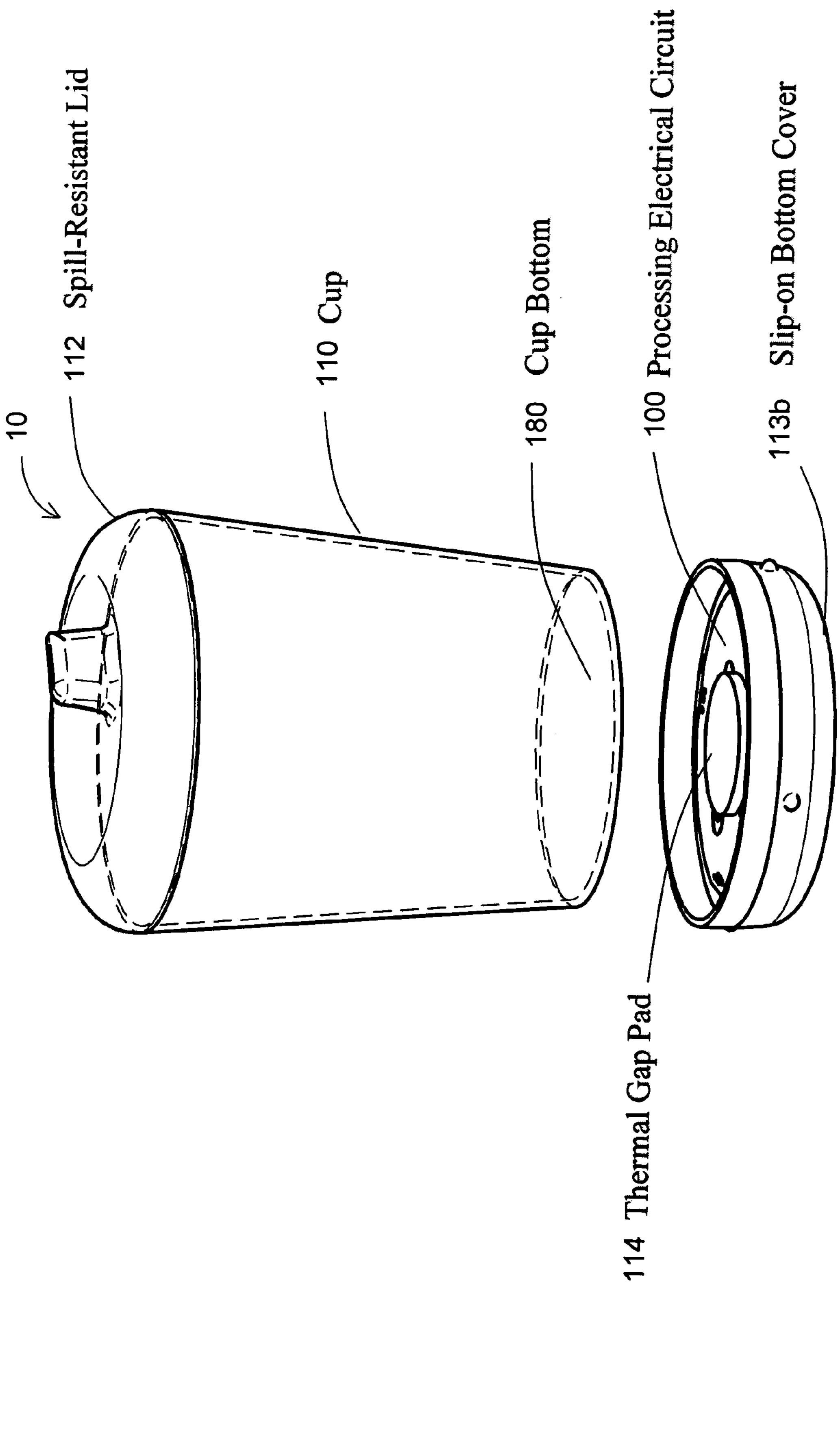
FIG. 8 illustrates another embodiment for the containers of FIG. 1 and FIG. 2.

FIG. 8 illustrates yet another alternate embodiment where the processing electrical circuit 100 is disposed into a slip-on removable bottom 113*b*. In this embodiment the processing electrical circuit 100 is water tightly sealed inside the removable bottom 113*b* once it has been slipped onto the bottom of the cup 110. It should be noted that the construction material of the removable bottom 113*b* should be flexible enough to allow expansion to fit over the bottom of the cup 110 and be transparent or semi-transparent to allow the visible light from the LEDs 150 to pass through the walls of the removable bottom 113*b*. It should be noted that an alternative material with similar properties could be used without deviating from the scope of this disclosure. The unit is designed such that the thermal gap pad 114 is compressed against the cup bottom 180 when the slip-on removable bottom 113*b* is slipped onto the bottom of the cup 110.

Figure 9:
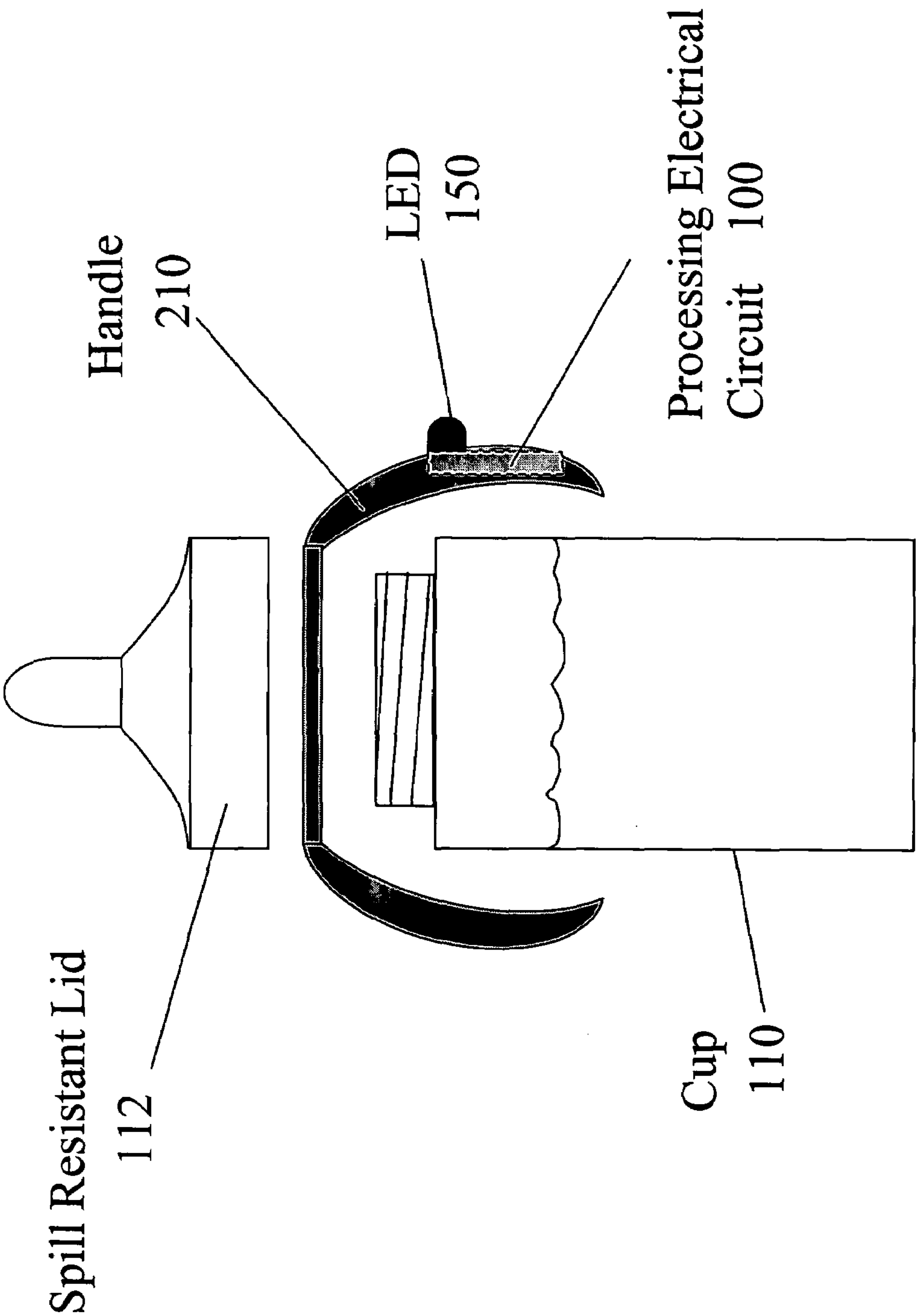
FIG. 9 illustrates an embodiment for mounting the electrical circuit of FIG. 1 and FIG. 2 on a bottle.

FIG. 9 illustrates an embodiment with the processing electrical circuit 100 adapted to fit within a removable handle 210. In this embodiment a removable "handle" 210 is shown that can be optionally inserted between the cup 110 and the spill resistant lid 112. The processing electrical circuit 100 is disposed in the handle 210.

It should be further emphasized that the above-described embodiments of the present invention are merely possible examples of implementations and set forth for a clear understanding of the principles of the invention. Many variations, modifications, and combinations may be made to the above-described embodiments of the invention without departing substantially from the spirit and principles of the invention. All such modifications, combinations, and variations are intended to be included herein within the scope of this disclosure and the present invention and protected by the following claims.

The invention claimed is:

1. A children's drinking cup with a freshness notification system comprising:

a spill-resistant lid having a child's drinking spout containing a self-sealing outlet valve;

a thermal sensor, coupled to the cup, for sensing the temperature of a cold beverage within the cup;

an electrical circuit having a comparator for determining when the sensed temperature is below a threshold value where the threshold value indicates the freshness of said beverage;

a battery that is suitable for incorporation into said children's drinking cup for providing power to the electrical circuit;

a sensor for detecting the physical movement of the cup and enabling the electrical circuit to become inactive when said cup is not moving and active when said cup is moving;

a switch for controlling said electrical circuit;

a switch inhibit means that prevents said switch from controlling said electrical circuit unless said switch is continually activated for an extended period of time; and a display device responds to the output of the comparator.

2. The cup of claim 1 wherein said display device is one or more light emitting diodes (LEDs).

3. The cup of claim 1 wherein said display device provides an audible sound.

4. The cup of claim 1 wherein the thermal sensor is a thermistor.

5. The cup of claim 1 wherein said electrical circuit is enclosed in a sealed cavity within the body of said cup.

6. The cup of claim 1 wherein said electrical circuit is disposed within a removable base.

7. A method for determining a freshness of a beverage contained inside a children's drinking cup, the method comprising the steps of:

incorporating an electrical circuit into the children's drinking cup;

detecting the physical movement of said cup;

controlling said detecting of movement by activating a switch;

ignoring the controlling said detecting of movement step by activating a switch unless the switch has been activated for an extended period of time;

monitoring the time the cup has not been moved;

comparing said time to one or more reference times; and displaying the results of the comparing step as a notification of the freshness of said beverage.

8. The method of claim 7 wherein said displaying is providing an audible sound.

9. The method of claim 7 wherein said cup has a spill-resistant lid having a child's drinking spout containing a self-sealing outlet valve.

10. The method of claim 7 wherein said displaying is the flashing of one or more LEDs.

11. A cup with a liquid freshness notifier comprising:

a spill-resistant lid having a child's drinking spout containing a self sealing outlet valve;

a battery for powering said freshness notifier;

a timing circuit;

a switch for activating said timing circuit;

a sensor for sensing when said cup is physically moved; and an indicator to indicate that a desired length of time has been exceeded since the activation of said timing circuit and/or since said cup has been moved, wherein said desired length of time indicates the freshness of said beverage; and a switch inhibit means that prevents said timing circuit from being reactivated before said length of time has passed unless said switch is continually activated for an extended period of time.

12. The cup of claim 11 wherein the indicator emits sound.

13. The cup of claim 11 wherein said indicator is one or more LEDs.

14. The cup of claim 11 further having a removable handle containing said freshness notifier.

15. A beverage container having a beverage freshness notification apparatus, the beverage container comprising:

a cup with an opening for filling or removing a beverage from the cavity of the cup, the cup further having sides and a bottom wherein the bottom and sides have an inside surfaces and an outside surfaces;

a motion sensor for sensing when said cup is physically moved;

a timing circuit;

a switch for activating said timing circuit;

a switch inhibit means that prevents said timing circuit from being reactivated before a desired length of time has passed unless said switch is continually activated for an extended period of time;

a battery for powering said freshness notification apparatus;

a thermal sensor coupled to the bottom outside surface of the cup;

a comparator coupled to the thermal sensor for comparing the output of the sensor to desired temperature values; and a display device exhibits beverage temperature freshness information in response to an output from the comparator, the motion sensor, and the timing circuit.

16. The container of claim 15 wherein the thermal sensor is coupled to the outside surface of bottom of the cup via a highly flexible, electrically insulating, thermally conductive air gap filler pad having a thermal conductivity of at least 2.8 Watt per Meter per degree Kelvin.

* * * * *